Patented May 24, 1949

2,471,077

UNITED STATES PATENT OFFICE 2,471,077

PRODUCTION OF CYCLIC SULFIDES

Robert J. Moore, Berkeley, and Robert A. Trimble, El Cerrito, Calif., assignors to Shell Development Company, San Francisco, Calif., a corporation of Delaware No Drawing. Application September 23, 1946, Serial No. 698,862

19 Claims. (Cl. 260—329)

This invention relates generally to the production of cyclic sulfides and, particularly, to an improved method by which cyclic sulfones may be converted to the corresponding cyclic sulfides. The invention is especially concerned with the conversion of sulfolanyl compounds and 2-sulfolenyl compounds to the corresponding saturated tetrahydrothiophene and saturated substituted thiophenes.

The tetrahydrothiophene derivatives, to the production of which the invention is particularly directed, have a number of valuable and widely diversified uses. Tetrahydrothiophene and its derivatives, for example, have been found useful as intermediates in the preparation of biotin. Tetrahydrothiophene and certain hydrocarbyl substitution products thereof have been used medicinally and have proved of value in the manufacture of corrosion inhibitors. None of these compounds was available in large quantities in the past, however, because of the tedious and expensive methods of manufacture which were formerly necessary, such as the cyclizing of halomercaptans. Their use industrially, has, therefore, been greatly restricted.

We have discovered that tetrahydrothiophene and saturated substituted thiophenes may be produced economically and in high yield from sulfolanyl compounds and 2-sulfolenyl compounds by carefully controlled reaction thereof with hydrogen in the presence of certain catalysts. This was most unexpected since sulfur compounds generally display a pronounced deactivating behavior toward catalysts, as is well known. It was surprising to find, further, that under properly regulated conditions we were able to obtain high yields of tetrahydrothiophene and saturated substituted thiophenes while at the same time substantially avoiding splitting out of hydrogen sulfide and other rupturing of the starting molecule. Thus, our process makes available in commercial quantities a wide variety of new compounds as well as a number of old compounds which formerly were little more than laboratory curiosities.

Accordingly, it is an object of the invention to provide a catalytic process for the production of tetrahydrothiophene and saturated substituted thiophenes from sulfolanyl compounds and 2-sulfolenyl compounds without appreciable elimination of sulfur or rupturing of the carbon-sulfur ring, or nucleus, in said compounds. Another object is to provide a method for preparing tetrahydrothiophene and substitution products thereof by a vapor phase process. Still another object is to provide a catalytic process for the conversion of sulfolanyl compounds and 2-sulfolenyl compounds to tetrahydrothiophene or saturated substituted thiophenes, which process may be conducted at moderate temperatures and pressures. It is another object to provide a process for converting sulfolanyl compounds and 2-sulfolenyl compounds to tetrahydrothiophene or saturated substituted thiophenes by a direct process in which little or no hydrogen sulfide is formed. Other and ancillary objects and advantages of the invention and the manner in which they may be accomplished will appear from the following description thereof.

In accordance with the process of the present invention the sulfolanyl compounds and 2-sulfolenyl compounds may be converted to tetrahydrothiophene or saturated substituted thiophenes by a controlled reaction of these compounds in the vapor phase with hydrogen in the presence of a hydrogenation catalyst. The reaction is exothermic and therefore care must be exercised to assure that the temperature does not reach the point at which the particular sulfolanyl compounds and 2-sulfolenyl compounds will undergo thermal decomposition. The degree of care required in controlling the temperature in the reaction chamber will vary somewhat with the reactants employed. In general, however, the temperature will be affected to a greater extent by the character (activity) of the catalyst, the rate at which the reactants are passed over the catalyst, and the volume ratio of reactants to catalyst. The effects of these variables, together with the manner in which we prefer to conduct our process, will be described in more detail hereinafter when specific examples of the process will be given.

By the term "sulfolane" is meant the saturated cyclic sulfone compound having the following structural formula:

As employed herein, the term "a sulfolanyl radical" is the radical resulting from the removal of one or more hydrogen atoms from the nuclear carbon atoms in sulfolane, and compounds containing such a radical, including sulfolane itself, are generically referred to herein as "sulfolanyl compounds."

The term "sulfolene" is employed herein to designate the unsaturated compound containing four carbon atoms and a sulfur atom in a ring, said structure having a single olefinic linkage between two adjoining carbon atoms, with the sulfur atom having two oxygen atoms attached thereto, and with the remaining free bonds of the nuclear carbon atoms being attached to hydrogen atoms. This compound has also been termed "thiacyclopentene-1,1-dioxide." The term "sulfolene" therefore comprises 3-sulfolene, represented by the formula:

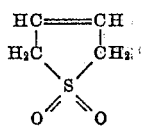

as well as 2-sulfolene, represented by the formula:

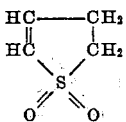

The term "sulfolenyl radical" is employed herein to designate the radical resulting from the removal of one or more hydrogen atoms from the nuclear carbon atoms in sulfolene, the term being prefixed by either 2- or 3- when referring to particular compounds. Compounds containing such a radical, including 2- or 3-sulfolene itself, are generically referred to herein as "sulfolenyl compounds."

In accordance with well-recognized nomenclature practice, the terms sulfolane and either 2- or 3-sulfolene may also form a part of the name of particular compounds wherein one or more of the hydrogen atoms attached to the carbon-sulfur nucleus of the cyclic sulfone compound are substituted by a corresponding number of other functional groups in the numbered position of the ring as indicated in the case of each particular compound. These substituents are preferably substituted or unsubstituted hydrocarbon radicals such as the alkyl, alkenyl, cyclo-alkyl, cycloalkenyl, aryl, aralkyl or aralkenyl radicals. Other substituents which may be present on the ring structure are the hydrocarbyloxy radicals such as alkoxy, aralkoxy, alkenoxy, and aralkenoxy, and the nitrile, amino and hydroxyl radicals. The halogens, and various heterocyclic radicals, may also be present as substituents on the ring.

Of the sulfolenyl compounds, only the 2-sufolenyl compounds are intended to be included within the scope of our invention since they are quite stable at moderate temperatures and may be vaporized without decomposition. Therefore, when the term "sulfolenyl compounds" is used herein it is to be understood that only the stable 2-sulfolenyl compounds are meant. The 3-sulfolenyl compounds, on the other hand, generally decompose when attempts are made to distill them, a feature which renders them unsuited to a vapor phase process. The 3-sulfolenyl compounds may be converted to 2-sulfolenyl compounds by treatment of the former with a caustic potash solution, heating the resulting mixture of both isomers to decompose the 3-sulfolenyl compounds, and distilling the resulting 2-sulfolenyl compound from the residue.

The numbering system for the cyclic sulfone or the thiophene ring is indicated below:

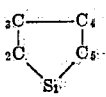

This is in accordance with the accepted system of numbering as exemplified by the compounds of this type of ring structure given on page 44 of Patterson and Capoll, The Ring Index, Reinhold Publishing Corp., New York, 1940; Am. Chem. Soc. Monograph No. 84.

Examples of sulfolanyl compounds, here named according to the above numbering system, which may be converted to tetrahydrothiophene and saturated substituted thiophenes, are: sulfolane, 2-methyl-sulfolane, 2,4-dimethyl-sulfolane, 2,3,4,5-tetramethyl-sulfolane, 2-vinyl-sulfolane, 2-vinyl-4-methyl-sulfolane, 2-allyl-sulfolane, 2-allyl-4-methyl-sulfolane, 2-ethyl-sulfolane, 2,4-diethyl-sulfolane, 2,3,4,5-tetraethyl-sulfolane, 2-n-propyl-sulfolane, 2,4-di-n-propyl-sulfolane, 2-isopropyl-sulfolane, 2,4-diisopropyl-sulfolane, 2-cyclohexyl-sulfolane 3,5,5-trimethyl-(2-cyclohexyl)-sulfolane, 2-phenyl-sulfolane, 2-phenyl-4-methyl-sulfolane, 2-benzyl-sulfolane, 2,4-diphenyl-sulfolane, 2-xylyl-sulfolane, 2-xylyl-4-methyl-sulfolane, 2-methallyl-4-ethyl-sulfolane, 2-methyl-4-chloro-sulfolane, 2,4-dichloro-sulfolane, 2-methoxy-sulfolane, 2-methoxy-4-chloro-sulfolane, 2-methyl-4-amino-sulfolane, 2,3,4,5-tetramino-sulfolane, etc.

Illustrative of the sulfolenyl compounds which may be converted to tetrahydrothiophene and saturated substituted thiophenes in accordance with the process of the present invention are 2-sulfolene, 2-methyl-2-sulfolene, 2,5-dimethyl-2-sulfolene, 3-methyl-2-sulfolene, 2,4-dimethyl-2-sulfolene, 3,4-dimethyl-2-sulfolene, 4-methyl-2-sulfolene, 3-ethyl-2-sulfolene, 2-hydroxy-2-sulfolene, 2-methoxy-2-sulfolene, 2-ethyl-2-sulfolene, 2-methyl-3-ethyl-2-sulfolene, 2-methyl-3-isopropyl-2-sulfolene, 2-vinyl-2-sulfolene, 3-allyl-2-sulfolene, 2-vinyl-2-sulfolene, 3-methyl-4-chloro-2-sulfolene, 2-chloro-3-methyl-2-sulfolene, 3-tertiarybutyl-2-sulfolene, 3-phenyl-2-sulfolene, 3,4-diphenyl-2-sulfolene, 2-amino-2-sulfolene, 2-methoxy-5-chloro-2-sulfolene, etc.

The catalysts which may be employed in our process must be hydrogenation catalysts. In addition, however, for most efficient execution of the process, the catalyst should be characterized by the additional quality of being immune or substantially immune to deactivation by sulfur-containing organic compounds. Broadly speaking, therefore, any hydrogenation catalyst may be used such as nickel, platinum, nickel-copper, iron, palladium, cadmium, tin and silver, although their susceptibility to sulfur poisoning may greatly shorten their lives. They are not preferred for our process, however, since their activity may promote rapid reactions and rapid temperature rises which are difficult to control. Therefore, we generally prefer to use metallic oxides and sulfides as our catalysts. In some cases the oxides of some of the foregoing or other metals may be advantageously used, for example, $MoO_3$, $Cr_2O_3$, $CoO$, $ZnO-Cr_2O_3$ and $WO_3$. We preferably use the sulfides of molybdenum, cobalt, tungsten, iron and nickel, individually or in combination with one another, as the catalysts in our process. Another preferred group of catalysts are the modified molybdic acid salts represented by ammonium phosphomolybdate and cobalt thiomolybdate. We particularly prefer nickel sulfide.

It is sometimes necessary or convenient to use a mixture of several catalysts to effect a particular desired reaction, as is well known, and it is therefore understood that any of the abovementioned catalysts may be combined with any of the others, or with any other hydrogenation catalyst, and employed in the combined form. Moreover, the catalysts may be further combined with such agents as alumina, magnesia, silica, natural or acid activated clays, such as fuller's earth, etc., to act as modifiers, stabilizers, promoters or supports.

As stated above, the temperature rise within the reactor due to the exothermic nature of the conversion reaction depends in part upon the character of the reactants and the activity of the catalyst. Once these variables are determined, the other variables, including the volume of the reaction chamber, the ratio of reactants to catalyst, and the rate at which the reactants pass over the catalyst may be determined without great difficulty. The importance of these variables in controlling the temperature of the reactants is apparent. For example, given a particular catalyst and a particular cyclic sulfone, it is clear that the heat evolved in the reaction per unit of time will vary directly with the number of molecules of the reactants in contact with the catalyst during that time. The temperatures of the reactants within the reaction chamber will depend in part upon the rate at which the reactants are passed through the chamber, the temperature and specific heat of the incoming reactants, and the ratio of reactants to catalyst, as well as upon external devices for heating or cooling the reaction chamber. For most satisfactory and efficient operation of our process we have found it advantageous to utilize the variables to bring the temperature of the reactants close to, but of course not above, the temperature at which the particular sulfolane or sulfolene will undergo substantial thermal decomposition during the time it is maintained at that temperature.

In the examples below, as well as elsewhere in the specification and in the claims, the term "liquid hourly space velocity" (LHSV) will be understood to denote the volume of cyclic sulfone, measured as a liquid, coming in contact with a unit volume of catalyst per hour. This convention is followed even though the cyclic sulfone is actually in the vapor phase when it passes through or over the catalyst within the reaction chamber. Thus, by a LHSV of 2.0, it will be understood herein that the conditions of the process are such that there is a throughput of two volumes of cyclic sulfone, as a liquid, per unit volume of catalyst in the reaction chamber per hour.

*Example I*

2,4-dimethyl sulfolane in the vapor phase was passed with hydrogen over a nickel sulfide-alumina catalyst at a pressure of about 135 p. s. i. gage and a temperature of about 300° C. The LHSV was maintained at about 0.5 and the mole ratio of hydrogen to dimethyl sulfolane maintained at about 50:1. The resulting product was separable into three main fractions consisting of unreacted dimethylsulfolane, water and dimethyltetrahydrothiophene. About 25% of the dimethylsulfolane reacted, of which about 70% appeared as dimethyltetrahydrothiophene. Less than 0.1% of mercaptan was found to have been formed, and tests upon the residual hydrogen gave no indication of hydrogen sulfide.

*Example II*

Tetrahydrothiophene-1,1-dioxide (sulfolane) in the vapor phase is passed with hydrogen at a pressure of about 150 p. s. i. gage and a temperature of about 350° C. over a catalyst of molybdenum sulfide deposited on Grade-A activated alumina. The LHSV is maintained at about 1.0 and the mole ratio of hydrogen to sulfolane maintained at about 30:1. About 40% of the sulfolane feed is reacted, of which about 80% appears as tetrahydrothiophene.

*Example III*

2-sulfolene is converted to tetrahydrothiophene by passing the former in the vapor phase with hydrogen at a pressure of about 105 p. s. i. gage and a temperature of about 250° C. over a catalyst of ammonium phosphomolybdate deposited on a Grade-A activated alumina. The LHSV is maintained at about 0.45 and the mole ratio of hydrogen to sulfolene maintained at about 50:1.

By variations of the conditions and catalysts of the above examples 2-methyl-sulfolane may be converted to 2-methyltetrahydrothiophene; 2,3,4,5-tetramethyl-sulfolane to 2,3,4,5-tetramethyltetrahydrothiophene; 2-vinyl-sulfolane to 2-ethyltetrahydrothiophene; 2,5-dimethyl-2-sulfolene to 2,5-dimethyltetrahydrothiophene; 2-methyl-4-chloro-2-sulfolene to 2-methyl-4-chlorotetrahydrothiophene; etc.

The pressures under which the reactions of our process are conducted are not critical and therefore a wide range of pressures is permissible. The reactions may, for example, be conducted advantageously at atmospheric pressure, as well as at considerably higher pressures such as 300 or 400 p. s. i. gage, or even higher. In general, the only limitation as to pressure will be the structural limitations of the reactor vessel.

The temperatures at which our conversion reactions are conducted are extremely important, however, since catalytic activity and stability of the cyclic sulfone are directly dependent upon temperature. Thus, too high a temperature in any particular reaction might easily render the catalyst too active with the result that an altogether different reaction product than that desired might be obtained; or the cyclic sulfone itself might decompose even without catalytic influence. It is therefore best, when conducting the conversions of our invention, to maintain the temperature within the reaction chamber sufficient to cause the sulfolanyl or sulfolenyl compound to be converted but substantially below the temperature at which the ring of the particular sulfone involved is ruptured. For conversions of sulfolane and its substitution products, temperatures should be kept below about 450° C., and preferably between about 250° C. and about 350° C.; above 450° C. the increased thermal and catalytic activity causes the destruction of the starting molecule. Of course, the conversions may be conducted at considerably lower temperatures, such as about 200° C. In general, the minimum temperature will depend upon the boiling point of the sulfolane involved. The reactions involving 2-sulfolene and its substitution products should be maintained below about 400° C. because of the greater instability of these compounds.

The effect of the ratio of hydrogen to cyclic sulfone is not critical and may be varied over an extremely wide range with satisfactory results. To assure an efficient conversion of the sulfolanyl or sulfolenyl compound to the corresponding saturated thiophene it is desirable to maintain a substantial molar excess of hydrogen in the catalyst chamber. Where the conversion reaction involves the sulfolanyl compounds wherein there is no unsaturation in any of the ring substituents, a mole ratio of hydrogen to sulfolanyl compound of at least 10:1 has been found satisfactory, although higher mole ratios such as 30:1, or even 50:1 or higher, are desirable. We particularly prefer to employ ratios of between about 30:1 and about 50:1 when converting sulfolane and its saturated substitution products to tetrahydrothiophene and its substitution products. When any unsaturation is present in the starting molecule, as when such molecule is 2-sulfolene, or an unsaturated substitution product of sulfolane or 2-sulfolene, satisfactory results can be obtained by using substantially the same range of hydrogen ratios used in reactions involving sulfolane and its saturated substitution products. However, when the starting molecule has several points of unsaturation it is advantageous to use a correspondingly higher hydrogen ratio than would have been necessary for a saturated molecule of the same number of carbon atoms.

Hydrogen ratio, temperature, liquid hourly space velocity, catalyst activity, and stability of the cyclic sulfones reacted, are all influential in guiding the course of our reactions. Particularly long reaction times are to be avoided because secondary reactions will cause decomposition of the desired product, leading to inefficient operation. In general, higher liquid hourly space velocities will be used when the reaction temperature is increased, ample provision being made for removal of heat of reaction.

To summarize, then, it can be said that, for any particular conversion reaction contemplated by the present invention, the temperature of the reactants must be kept below the decomposition temperature of the cyclic sulfone involved. The temperature may be influenced by proper selection of the catalyst, by the space velocity, by the hydrogen ratio, or by external temperature controls.

When we wish to convert sulfolane or its saturated derivatives to tetrahydrothiophene or saturated substituted thiophenes, we maintain the temperature between about 250° C. and about 450° C., and preferably between about 250° C. and about 350° C. For these reactions satisfactory liquid hourly space velocities are between about 0.4 and about 5.0, and preferably about 2.0.

2-Sulfolene and its substitution products are more unstable than the corresponding sulfolane and its substituted products. Consequently, when converting these compounds to the corresponding tetrahydrothiophene or saturated substituted thiophenes, we maintain the temperature between about 250° C. and about 400° C., and preferably below about 350° C. Satisfactory space velocities for the reactions involving sulfolenyl compounds are substantially the same as those indicated above for the sulfolanyl compounds.

Generally, the unsaturated substitution products of both sulfolane and 2-sulfolene are less stable than sulfolane and its saturated substitution products. Therefore, the unsaturated substitution products of these compounds are preferably converted to saturated substituted thiophenes under substantially the same conditions of temperature and space velocity as given above for 2-sulfolene and its substitution products.

We have also found it convenient and entirely satisfactory to use the more active catalysts, e. g. nickel sulfide, for the more stable compounds such as the sulfolanyl compounds, and the less active catalysts, e. g. ammonium phosphomolybdate, for the less stable compounds, such as the 2-sulfolenyl compounds. While these are preferred, it is of course understood that any known hydrogenation catalyst may be used according to our process, employing other means, if necessary, to control the temperature of the reaction where catalyst activity is high. As indicated previously, however, we prefer to use a sulfur-immune hydrogenation catalyst since it may be used for long periods with satisfactory performance without reactivation.

While we have described what are presently considered the preferred embodiments of our invention, it is not intended so to limit the scope of the invention, except as limited by the appended claims, but to embrace therein any modifications readily occurring to those skilled in the art.

We claim as our invention:

1. The method of converting a cyclic sulfone to the corresponding saturated cyclic sulfide, said sulfone being selected from the group consisting of sulfolanyl compounds and 2-sulfolenyl compounds, which method comprises contacting said cyclic sulfone in the vapor phase with an excess of hydrogen in the presence of a hydrogenation catalyst at a temperature below that at which said cyclic sulfone will undergo thermal decomposition.

2. The method of converting a cyclic sulfone being to the corresponding saturated cyclic sulfide, said sulfone selected from the group consisting of sulfolanyl compounds and 2-sulfolenyl compounds, which method comprises contacting said cyclic sulfone in the vapor phase with an excess of hydrogen in the presence of a sulfur-immune hydrogenation catalyst at a temperature below that at which said cyclic sulfone will undergo thermal decomposition, said method being characterized in that substantially no hydrogen sulfide is formed and in that the ring structure of said cyclic sulfone is not otherwise broken.

3. The method according to claim 2 wherein the hydrogenation catalyst is nickel sulfide.

4. The method of converting a cyclic sulfone to the corresponding saturated cyclic sulfide, said sulfone being selected from the group consisting of sulfolanyl compounds and 2-sulfolenyl compounds, which method comprises reacting said cyclic sulfone at superatmospheric pressure in the vapor phase with hydrogen in the presence of a nickel sulfide hydrogenation catalyst at a temperature below that at which said cyclic sulfone will undergo thermal decomposition, the molar ratio of hydrogen to said cyclic sulfone being between about 10:1 and about 50:1, and the liquid hourly space velocity of said cyclic sulfone being between about 0.4 and about 5.0, said method being characterized in that substantially no hydrogen sulfide is formed and in that the ring structure of said cyclic sulfone is not otherwise broken.

5. The method of converting a sulfolanyl compound to the corresponding cyclic sulfide, which method comprises contacting said compound in the vapor phase with an excess of hydrogen in the presence of a sulfur-immune hydrogenation catalyst at a temperature below that at which said compound will undergo thermal decomposition.

6. The method according to claim 5 wherein the hydrogenation catalyst is nickel sulfide.

7. The method of converting a sulfolanyl compound to the corresponding cyclic sulfide, which method comprises reacting said compound in the vapor phase with hydrogen in the presence of a nickel sulfide hydrogenation catalyst at a temperature between about 250° C. and about 450° C., the molar ratio of the hydrogen to said compound being between about 10:1 and about 50:1.

8. The method of converting a sulfolanyl compound to the corresponding cyclic sulfide, which method comprises reacting said compound at superatmospheric pressure in the vapor phase with hydrogen in the presence of a nickel sulfide hydrogenation catalyst at a temperature of about 300° C., the molar ratio of hydrogen to said compound being between about 30:1 and 50:1, and the liquid hourly space velocity of said compound being between about 0.4 and 5.0.

9. The method of converting a 2-sulfolenyl compound to the corresponding saturated cyclic sulfide, which method comprises contacting said compound in the vapor phase with an excess of hydrogen in the presence of a sulfur-immune hydrogenation catalyst at a temperature below that at which said compound will undergo thermal decomposition.

10. The method according to claim 9 wherein the hydrogenation catalyst is nickel sulfide.

11. The method of converting a 2-sulfolenyl compound to the corresponding saturated cyclic sulfide, which method comprises reacting said compound in the vapor phase with hydrogen in the presence of a nickel sulfide hydrogenation catalyst at a temperature between about 250° C. and about 400° C., the molar ratio of the hydrogen to said compound being between about 10:1 and about 50:1.

12. The method of converting a 2-sulfolenyl compound to the corresponding saturated cyclic sulfide, which method comprises reacting said compound at superatmospheric pressure in the vapor phase with hydrogen in the presence of a nickel sulfide hydrogenation catalyst at a temperature of about 250° C., the molar ratio of hydrogen to said compound being between about 30:1 and about 50:1, and the liquid hourly space velocity of said compound between about 0.4 and 5.0.

13. The method of converting 2,4-dimethyl sulfolane to 2,4-dimethyl-tetrahydrothiophene which comprises contacting the 2,4-dimethyl sulfolane in the vapor phase with an excess of hydrogen in the presence of an sulfur-immune hydrogenation catalyst at a temperature of about 300° C.

14. The method according to claim 13 wherein the hydrogenation catalyst is nickel sulfide deposited upon activated alumina.

15. The method of converting 2,4-dimethyl sulfolane to 2,4-dimethyl-tetrahydrothiophene which comprises reacting the 2,4-dimethyl sulfolane at superatmospheric pressure in the vapor phase with hydrogen in the presence of a nickel sulfide hydrogenation catalyst at a temperature of about 300° C., the molar ratio of hydrogen to 2,4-dimethyl sulfolane being maintained at about 50:1, and the liquid hourly space velocity being maintained at about 0.5.

16. The method of converting sulfolane to tetrahydrothiophene which comprises contacting the sulfolane in the vapor phase with an excess of hydrogen in the presence of a hydrogenation catalyst consisting of molybdenum sulfide deposited on activated alumina, said reaction being conducted at a temperature of about 350° C.

17. The method of converting sulfolane to tetrahydrothiophene which comprises reacting the sulfolane at superatmospheric pressure in the vapor phase with hydrogen in the presence of a molybdenum sulfide hydrogenation catalyst at a temperature of about 350° C., the molar ratio of hydrogen to sulfolane being maintained at about 30:1, and the liquid hourly space velocity being maintained at about 1.0.

18. The method of converting 2-sulfolene to tetrahydrothiophene which comprises contacting the 2-solfolene in the vapor phase with an excess of hydrogen in the presence of a hydrogenation catalyst consisting of ammonium phosphomolybdate deposited on activated alumina, said reaction being conducted at a temperature of about 250° C.

19. The method of converting 2-sulfolene to tetrahydrothiophene which comprises reacting the 2-sulfolene at superatmospheric pressure in the vapor phase with hydrogen in the presence of an ammonium phosphomolybdate hydrogenation catalyst at a temperature of about 250° C., the molar ratio of hydrogen to 2-sulfolene being maintained at about 50:1, and the liquid hourly space velocity being maintained at about 0.45.

ROBERT J. MOORE.
ROBERT A. TRIMBLE.

REFERENCES CITED

The following references are of record in the file of this patent:

UNITED STATES PATENTS

| Number | Name | Date |
|---|---|---|
| 2,233,999 | Farlow | Mar. 4, 1941 |

OTHER REFERENCES

Backer, Rec. Trav. Chim. 54, 538–44 (1935).